United States Patent [19]

Schmid

[11] 4,242,020
[45] Dec. 30, 1980

[54] MILLING TOOL, ESPECIALLY GANG CUTTER

[75] Inventor: Karlheinz Schmid, Neckartenzlingen, Fed. Rep. of Germany

[73] Assignee: Gebrueder Heller, Maschinenfabrik GmbH, Nuertingen, Fed. Rep. of Germany

[21] Appl. No.: 64,065

[22] Filed: Aug. 6, 1979

[30] Foreign Application Priority Data

Aug. 19, 1978 [DE] Fed. Rep. of Germany ....... 2836395

[51] Int. Cl.³ ............................ B23L 1/00; B23B 5/18; B26D 1/12
[52] U.S. Cl. ......................................... 409/234; 82/9; 407/31
[58] Field of Search ............... 409/191, 192, 203, 204, 409/213, 217, 231, 232, 234, 236; 407/31; 82/9

[56] References Cited

U.S. PATENT DOCUMENTS

| 1,012,564 | 12/1911 | Krenke | 409/231 X |
| 2,467,030 | 4/1949 | Harrington | 407/31 X |
| 2,941,451 | 6/1960 | Hanson et al. | 409/234 |
| 3,986,543 | 10/1976 | Slayton et al. | 407/31 X |
| 4,103,588 | 8/1978 | Schmid | 407/31 X |
| 4,116,111 | 9/1978 | Schmid | 82/9 X |

FOREIGN PATENT DOCUMENTS 2836341  4/1979  Fed. Rep. of Germany ........... 409/231

*Primary Examiner*—Harrison L. Hinson
*Attorney, Agent, or Firm*—W. G. Fasse; D. F. Gould

[57] ABSTRACT

The present gang cutter for crankshaft milling machines comprises a plurality of disk cutters spaced from one another on a common, rotational axis by spacers which may be bearings. The gang cutter is divided into a plurality of partial units corresponding in number to the number of disk cutters. Each unit comprises a disk cutter and a center drum member. Adjacent units are operatively connected to each other whereby an adjustment disk may be inserted between adjacent units. A certain number of drum members corresponding to the number of bearings is constructed as bearing rings.

9 Claims, 1 Drawing Figure

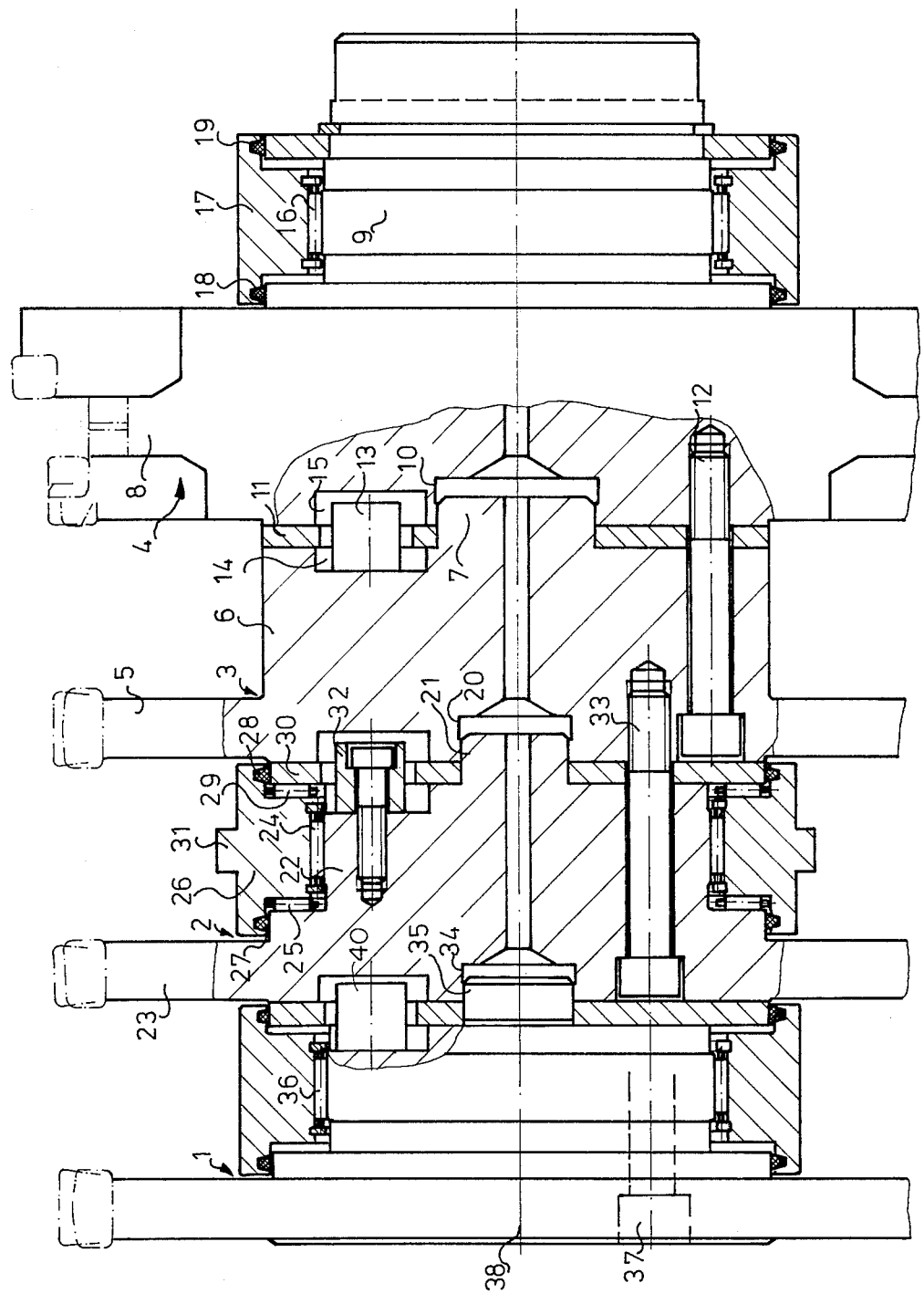

1

MILLING TOOL, ESPECIALLY GANG CUTTER

BACKGROUND OF THE INVENTION

The present invention relates to a milling tool, especially a gang cutter for a crankshaft milling machine. Such milling tools are rotatably supported in a milling slide of a crankshaft milling machine and are driven through respective drive spindles. Each milling tool comprises a plurality of disk cutters ganged relative to a common rotational axis and spaced from each other by axial spacing elements. One or several of the spacing elements may be constructed as bearing means.

German Patent Publication (DOS) No. 2,630,047 discloses a milling cutter of the type described above. These gang cutters normally comprise a milling arbor or shaft on which the disk cutters are secured. The disk cutters are spaced from each other by rings and the entire unit is clamped together by a central screw. This type of structure is relatively expensive. Yet, a certain play cannot be avoided so that the cutting precision leaves room for improvement. Another drawback of the just described type of structure resides in the fact that due to vibrations fretting corrosion or so-called galling occurs already after a short operational time. Such galling makes the tool exchange very difficult and occasionally it becomes impossible to exchange the disk cutters without damaging the components of the cutting tool. Besides, such galling further diminishes the machining precision of the milling tool. The central clamping of the disk cutters on the milling arbor or shaft requires a very large tightening torque moment which is applied to the single milling tool tightening screw. To accomplish such tightening the respective tightening tools are rather involved and hence expensive.

OBJECTS OF THE INVENTION

In view of the above it is the aim of the invention to achieve the following objects singly or in combination:

to construct a gang milling tool of the type mentioned above which may be produced at lower costs while simultaneously assuring an improved stiffness against vibrations;

to construct a gang milling tool so that the entire tool is able of a more precise milling operation while simultaneously having a longer operational life; and to construct the milling tool from individual components which are secured to each other in such a manner that axial loads and torque loads are taken up by different elements of the entire tool structure.

SUMMARY OF THE INVENTION

According to the invention there is provided a gang milling tool which is characterized in that it comprises partial units corresponding in number to the number of disk cutters. Each partial unit thus comprises a disk cutter and a centric, drum type spacer member arranged so that neighboring or adjacent partial units are centered relative to each other and also secured to each other by respective securing means. An adjustment disk is arranged between two adjacent partial units. A certain number of said drum type members may be constructed to form bearing rings, said certain number corresponding to the number of bearing positions required for the particular type of gang cutter.

BRIEF FIGURE DESCRIPTION

In order that the invention may be clearly understood, it will now be described, by way of example, with reference to the accompanying drawing in which the single FIGURE illustrates a gang cutter or milling tool according to the invention whereby most of the view is a sectional illustration along the rotational axis of the tool while one of the milling cutters is only partially sectioned.

DETAILED DESCRIPTION OF A PREFERRED EMBODIMENT AND OF THE BEST MODE OF THE INVENTION

The gang cutter according to the invention comprises four partial units 1, 2, 3, and 4. The partial unit 3 comprises a disk cutter 5 and a centric, drum type spacer member 6 provided with a centric, centering stud 7. The partial unit 4 located to the right of the partial unit 3 also comprises a disk cutter 8. This disk cutter 8 has a cutting configuration which differs from that of the cutting configuration of the disk cutter 5. Each disk cutter is adapted in its shape to the particular shape that is to be machined by the respective cutter. The disk cutter 5 is provided with a centric, drum type spacer member 9 and with a centering bore 10 adapted to cooperate with the centering stud 7 of the unit 3. An adjustment disk 11 is arranged between the units 3 and 4, whereby the spacing between the drum type member 6 and the unit 4 may be precisely determined. The two partial units 3 and 4 are operatively connected to each other preferably by means of four screw bolts 12, only one of which appears in the drawing for simplicity's sake. These screw bolts have a threaded end fitting into a respectively threaded hole in the next adjacent unit. These screw bolts and holes are angularly spaced from each other around the central axis 38. In the preferred embodiment the screw bolts transmit axial loads only whereas torque moments are transmitted by drive cranks 13, 32, and 40. These drive cranks or studs extend through holes 14 and through the spacer disk 11 into an engaging hole 15 in the next adjacent unit. The fit between a drive crank or stud 13 and the respective hole 15 is such that there is no play in the circumferential direction but there is play in the radial and in the axial direction as shown in the drawing. The drum type spacer member 9 of the partial unit 4 differs from the drum type spacer member 6 of the partial unit 3 in that the former is constructed as an inner bearing ring of a needle bearing 16 cooperating with an outer bearing ring 17 of the needle bearing 16. The bearing is sealed by sealing rings 18 and 19. Strictly speaking, the outer bearing ring 17 with its sealing rings 18 and 19 does not form part of the milling tool or gang cutter proper. However, during the assembly of the milling tool the outer bearing ring 17 is suitably secured to the member 9 and when the tool is mounted in the milling machine, the ring 17 is also properly secured to the bearing support for the tool in the milling machine.

The right-hand free end of the drum type member 9 is provided with means for coupling the milling tool to a drive spindle of the milling machine. The details of this structure are not part of the invention.

The partial unit 4 comprises a centering bore 20 in its face facing toward the unit 2 and away from the unit 4. A centering stud 21 of the unit 2 fits into the centering bore 20. This centering stud 21 is secured to or forms part of the centric, drum type spacer member 22 of the unit 2 and extends axially away from its respective disk cutter 23 which is constructed substantially similar to the disk cutter 5 of the unit 3.

The drum type spacer member 22 forms on the one hand a bearing ring for a radial needle bearing 24. On the other hand the member 22 also provides one race surface for the axial or thrust bearing 25, the other race surface of which is located in the bearing ring 26. The outer bearing ring 26 is provided with two sealing rings 27 and 28 just as the bearing ring 17. Moreover, the ring 26 also provides a race surface for the axial or thrust bearing 29. The other or opposing bearing race surface of the bearing 29 is provided by one surface of the adjusting spacer ring 30 of the partial unit 2. The spacer ring 30 permits the precise determination of the spacing between the units 2 and 3 and thus between the disk cutters 5 and 23. The ring 30, as mentioned, is provided with a bearing race surface for the axial or thrust bearing 29. Therefore, only the opposite surface, facing a respective seating surface of the unit 3, may be machined, if necessary, in order to adjust the precise spacing between the disk cutters 5 and 23.

The outer bearing ring 26 comprises a circumferential bulge 31 by means of which the bearing ring 26 may be centered in the axial direction. The thrust bearings 25 and 29 are thus axially centered and thus the entire milling cutter is axially centered. For this purpose the bulge 31 is conventionally fitted into a respective fitting groove in the bearing support of the milling machine not shown.

The partial units 2 and 3 are connected to each other in the same manner as the partial units 3 and 4. Thus, torque moments are transmitted through the drive stud 32 and the axial connection is accomplished by the screw bolts 33. Again, only one screw bolt 33 is shown for simplicity's sake. The screw bolts 33 are spaced radially inwardly relative to the screw bolts 12.

The partial unit 2 comprises on its face facing the partial unit 1 away from the unit 3 a centering bore 34 cooperating with a centering stud 35 of the partial unit 1. The centering unit 1 is substantially constructed in the same manner as the partial unit 2 so that a more detailed description is unnecessary. However, the unit 1 does not have an axial centering bore nor does it have a thrust bearing. Merely a radial bearing 36 is provided which is constructed in the same manner as the above described radial bearing 16 so that again a repetition is unnecessary with regard to the description of the radial bearing 36. The partial units 1 and 2 are also interconnected with each other by screw bolt 37. The screw bolt 37 has the same radial spacing from the rotational axis 38 as the screw bolt 33. However, these bolts are angularly displaced relative to each other.

Instead of the centering studs 7, 21, and 35, with the corresponding dead-end centering bores 10, 20, 34 it is also possible to use other centrally arranged centering means. For example, a centering shaft could run through the entire length of the milling tool concentrically with the rotational axis 38 through a respective bore extending through all partial units. However, even centering means may be used which are positioned off-center relative to the axis 38. Such centering means could, for example, be located similarly as the drive studs. However, centrally located centering means are preferable because on the one hand such off-center located centering means would also be subject to different loads if the respective disk cutters are subject to differing loads. On the other hand a centering in the circumferential direction is not necessary.

As the result of the multiple interconnection of the partial units as described above according to the invention a construction is achieved which is substantially stiffer against vibration than prior art gang milling cutters having a central shaft carrying disk cutters spaced by intermediate bushings. Due to this increased vibration stiffness, the cutters according to the invention achieve a substantially larger working precision and a longer tool life as compared to prior art gang cutters of this type. Besides, the invention makes it possible to accomplish the axial centering of the milling cutters directly on the milling cutter itself, namely, by means of the axial bearings 25 and 29 in combination with the centering bulge 31 so that the thrust bearings necessary heretofore for the drive spindle have been obviated. This feature has the further advantage that the spacing of the individual disk cutters from the point which determines the axial centering becomes substantially smaller on the average so that heat expansions of the gang cutter have a substantially smaller influence on the precision of the spacing between the individual disk cutters than is possible in prior art gang cutters.

Although the invention has been described with reference to specific example embodiments, it will be appreciated, that it is intended to cover all modifications and equivalents within the scope of the appended claims.

What is claimed is:

1. A gang cutter for crankshaft milling machines, comprising a plurality of partial units having a common rotational axis, each partial unit comprising a disk cutter, centrally arranged spacer means, and means securing adjacent units to each other so that the units are arranged in a row and centered relative to said common rotational axis, adjustment disk means operatively interposed between adjacent units, and wherein certain of said spacer means comprise bearing means for operatively supporting said gang cutter in said crankshaft milling machine.

2. The gang cutter of claim 1, wherein said spacer means comprise a centric drum member forming an integral part of its respective disk cutter.

3. The gang cutter of claim 1, wherein the number of disk cutters corresponds to the number of partial units.

4. The gang cutter of claim 1, wherein each of said units comprises centering means arranged concentric relative to said common rotational axis.

5. The gang cutter of claim 1, wherein said securing means comprise bolts extending through one unit and operatively engaging the next adjacent unit.

6. The gang cutter of claim 1, further comprising means operatively engaging adjacent units for transmitting torque from unit to unit.

7. The gang cutter of claim 1, wherein each of said units comprises centering means arranged concentric relative to said common rotational axis, and wherein said securing means comprise threaded bolts and threaded holes in said units, said bolts and holes being uniformly distributed around said centering means whereby said securing means are displaced relative to each other from unit to unit.

8. The gang cutter of claim 7, wherein the securing means between two units on one side of one unit are radially displaced relative to the securing means between said one unit and the next adjacent unit on the other side of said one unit.

9. The gang cutter of claim 7, wherein the securing means between two units on one side of one unit are angularly displaced relative to the securing means between said one unit and the next adjacent unit on the other side of said one unit.

* * * * *